(12) United States Patent
McCloskey et al.

(10) Patent No.: US 6,797,802 B2
(45) Date of Patent: Sep. 28, 2004

(54) METHOD OF POLYCARBONATE PREPARATION

(75) Inventors: Patrick Joseph McCloskey, Watervliet, NY (US); Warren William Reilly, Northville, NY (US)

(73) Assignee: General Electric Company, Niskayuna, NY (US)

( * ) Notice: Subject to any disclaimer, the term of this patent is extended or adjusted under 35 U.S.C. 154(b) by 61 days.

(21) Appl. No.: 10/265,419

(22) Filed: Oct. 7, 2002

(65) Prior Publication Data

US 2004/0068087 A1 Apr. 8, 2004

(51) Int. Cl.[7] ............................................... C08G 64/00
(52) U.S. Cl. ........................ 528/196; 502/164; 528/198
(58) Field of Search ................................ 528/196, 198; 502/164

(56) References Cited

U.S. PATENT DOCUMENTS

| | | |
|---|---|---|
| 5,340,905 A | 8/1994 | Kuhling et al. |
| 5,399,659 A | 3/1995 | Kuhling et al. |
| 5,648,437 A | 7/1997 | Fischer et al. |
| 5,767,224 A | 6/1998 | Kuhling et al. |
| 6,569,985 B2 * | 5/2003 | McCloskey et al. ........ 528/196 |
| 6,610,814 B2 * | 8/2003 | Lemmon et al. ............ 528/198 |

FOREIGN PATENT DOCUMENTS

DE 196 46 401 5/1998

* cited by examiner

*Primary Examiner*—Terressa Boykin
(74) *Attorney, Agent, or Firm*—Andrew J. Caruso; Patrick K. Patnode

(57) ABSTRACT

The present invention provides a method of preparing polycarbonate, said method comprising (A) oligomerising in the presence of a catalyst at least one dihydroxyaromatic compound at a temperature in a range between about 220–280° C. and a pressure in a range between 180 mbar and 20 mbar, said catalyst comprising a tetraarylphosphonium compound and optionally a co-catalyst, to provide an oligomeric polycarbonate having a number average molecular weight, Mn, in a range between about 1000 and about 6000 daltons; and (B) in a second step heating the oligomeric polycarbonate formed in step (A) at a temperature range between about 280 and about 310° C. and a pressure in a range between about 15 mbar and about 0.1 mbar, to provide a polycarbonate having a weight average molecular weight, in a range between about 15,000 and about 50,000 daltons, said product polycarbonate comprising less than 1000 parts per million Fries product.

27 Claims, No Drawings

US 6,797,802 B2

METHOD OF POLYCARBONATE PREPARATION

BACKGROUND OF THE INVENTION

This invention relates to a method for the preparation of polycarbonate. More particularly the method relates to a method of preparing polycarbonate by the melt reaction of at least one dihydroxy aromatic compound with at least one diaryl carbonate, said melt reaction being mediated by a transesterification catalyst and optionally a co-catalyst said transesterification catalyst comprising at least one tetraarylphosphonium compound and said co-catalyst comprising an alkali metal hydroxide said product polycarbonate comprising less than 1000 parts per million Fries product.

Conventionally, polycarbonate is prepared by the reaction of a dihydroxy aromatic compound such as bisphenol A with phosgene in the presence of an aqueous phase comprising an acid acceptor such as sodium hydroxide and an organic solvent such as dichloromethane. Typically, a phase transfer catalyst, such as a quaternary ammonium compound or a low molecular weight tertiary amine, such as triethylamine is added to the aqueous phase to enhance the polymerization rate. This synthetic method is commonly known as the "interfacial" method for preparing polycarbonate.

The interfacial method for making polycarbonate has several inherent disadvantages. First it is a disadvantage to operate a process that requires phosgene as a reactant due to obvious safety concerns. Second it is a disadvantage to operate a process that requires using large amounts of an organic solvent because elaborate precautions must be taken to prevent adventitious release of the volatile solvent into the environment. Third, the interfacial method requires a relatively large amount of equipment and capital investment. Fourth, the polycarbonate produced by the interfacial process is prone to having inconsistent color, higher levels of particulates, and higher chlorine content, which can cause corrosion.

More recently polycarbonate has been prepared on a commercial scale in a solventless process involving the transesterification reaction between a dihydroxy aromatic compound (e.g. bisphenol A) and a diaryl carbonate (e.g., diphenyl carbonate) in the presence of a transesterification catalyst. This reaction is performed in a molten state in the absence of solvent, and is driven to completion by mixing the reactants under reduced pressure and high temperature with simultaneous distillation of the phenol by-product produced by the reaction. This method of preparing polycarbonate is referred to as the "melt" process. In some respects the melt process is superior to the interfacial method because it does not employ phosgene, it does not require a solvent, and it uses less equipment. Moreover, the polycarbonate produced by the melt process does not contain chlorine contamination from the reactants, has lower particulate levels, and has a more consistent color. Therefore it is highly desirable to use the melt process when making polycarbonate in commercial manufacturing processes.

A wide variety of transesterification catalysts have been evaluated for use in the preparation of polycarbonate using the melt process. Quaternary ammonium salts and alkali metal hydroxides, in particular sodium hydroxide, have proven to be particularly effective as transesterification catalysts. However, while alkali metal hydroxides are useful polymerization catalysts, they are also known to promote Fries reaction along the growing polycarbonate chains which results in the production of branched polycarbonate products. The presence of branching sites within a polycarbonate chain can cause changes in the melt flow behavior of the polycarbonate, which can lead to difficulties in processing.

It would be desirable, therefore, to develop a method for conducting melt polymerization reactions to provide product polycarbonates having high molecular weight while minimizing undesirable reactions, such as the Fries reaction.

BRIEF SUMMARY OF THE INVENTION

In one aspect, the present invention provides a method of preparing polycarbonate, said method comprising Step (A) oligomerising in the presence of a catalyst, at least one diaryl carbonate and at least one dihydroxyaromatic compound at a temperature in a range between about 220 and about 280° C. and a pressure in a range between about 180 mbar and about 20 mbar, said catalyst comprising a tetraaryl phosphonium compound and optionally a co-catalyst, to provide an oligomeric polycarbonate having a number average molecular weight in a range between about 1000 and about 7500 daltons and in a second step, Step (B) heating the oligomeric a polycarbonate formed in step (A) at a temperature in a range between about 280 and about 310° C. and at pressure in a range between about 15 mbar and about and about 0.1 mbar to provide a polycarbonate having a number average molecular weight between about 15000 daltons and about 50,000 daltons, said method comprising less than about 1000 parts per million Fries product.

In a further aspect, the present invention relates to both polycarbonate oligomers and high molecular weight polycarbonates prepared according to the method of the present invention.

DETAILED DESCRIPTION OF THE INVENTION

The present invention may be understood more readily by reference to the following detailed description of preferred embodiments of the invention and the examples included herein. In this specification and in the claims that follow, reference will be made to a number of terms which shall be defined to have the following meanings.

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein the term "polycarbonate" refers to polycarbonates incorporating structural units derived from one or more dihydroxy aromatic compounds and includes copolycarbonates and polyester carbonates.

As used herein, the term "melt polycarbonate" refers to a polycarbonate made by the transesterification of at least one diaryl carbonate with at least one dihydroxy aromatic compound.

"BPA" is herein defined as bisphenol A and is also known as 2,2-bis(4-hydroxyphenyl)propane, 4,4'-isopropylidenediphenol and p,p-BPA.

As used herein, the term "bisphenol A polycarbonate" refers to a polycarbonate in which essentially all of the repeat units comprise a bisphenol A residue.

As used herein, the term "polycarbonate" includes both high molecular weight polycarbonate and oligomeric polycarbonate. High molecular weight polycarbonate is defined herein as having a number average molecular weight, Mn, greater than 8000 daltons, and an oligomeric polycarbonate are defined as having number average molecular weight, Mn, less than 8000 daltons.

As used herein the term "percent endcap" refers to the percentage of polycarbonate chain ends that are not hydroxyl groups. In the case of bisphenol A polycarbonate prepared from diphenyl carbonate and bisphenol A, a "percent endcap" value of about 75% means that about seventy-five percent of all of the polycarbonate chain ends comprise phenoxy groups while about 25% of said chain ends comprise hydroxyl groups. The terms "percent endcap" and "percent endcapping" are used interchangeably.

As used herein the term "aromatic radical" refers to a radical having a valence of at least one and comprising at least one aromatic ring. Examples of aromatic radicals include phenyl, pyridyl, furanyl, thienyl, naphthyl, phenylene, and biphenyl. The term includes groups containing both aromatic and aliphatic components, for example a benzyl group, a phenethyl group or a naphthylmethyl group. The term also includes groups comprising both aromatic and cycloaliphatic groups for example 4-cyclopropylphenyl and 1,2,3,4-tetrahydronaphthalen-1-yl.

As used herein the term "aliphatic radical" refers to a radical having a valence of at least one and consisting of a linear or branched array of atoms which is not cyclic. The array may include heteroatoms such as nitrogen, sulfur and oxygen or may be composed exclusively of carbon and hydrogen. Examples of aliphatic radicals include methyl, methylene, ethyl, ethylene, hexyl, hexamethylene and the like.

As used herein the term "cycloaliphatic radical" refers to a radical having a valance of at least one and comprising an array of atoms which is cyclic but which is not aromatic, and which does not further comprise an aromatic ring. The array may include heteroatoms such as nitrogen, sulfur and oxygen or may be composed exclusively of carbon and hydrogen. Examples of cycloaliphatic radicals include cyclopropyl, cyclopentyl cyclohexyl, 2-cyclohexylethy-1-yl, tetrahydrofuranyl and the like.

As used herein the term "Fries product" is defined as a structural unit of the product polycarbonate which upon hydrolysis of the product polycarbonate affords a carboxy-substituted dihydroxy aromatic compound bearing a carboxy group adjacent to one or both of the hydroxy groups of said carboxy-substituted dihydroxy aromatic compound. For example, in bisphenol A polycarbonate prepared by a melt reaction method in which Fries reaction occurs, the Fries product includes those structural features of the polycarbonate which afford 2-carboxy bisphenol A upon complete hydrolysis of the product polycarbonate.

The terms "Fries product" and "Fries group" are used interchangeably herein.

The terms "Fries reaction" and "Fries rearrangement" are used interchangeably herein.

As used herein the term "Fries level" refers to the amount of Fries product present in a product polycarbonate.

As mentioned, the present invention provides a method of preparing polycarbonate, said method comprising Step (A) oligomerising in the presence of a catalyst at least one dihydroxyaromatic compound at a temperature in a range between about 220–280° C. and a pressure in a range between 180 mbar and 20 mbar, said catalyst comprising a tetraarylphosphonium compound and optionally a co-catalyst, to provide an oligomeric polycarbonate having a number average molecular weight, Mn, in a range between about 1000 and about 7500 daltons; and in a second step, Step (B), heating the oligomeric polycarbonate formed in step (A) at a temperature range between about 280 and about 310° C. and a pressure in a range between about 15 mbar and about 0.1 mbar, to provide a polycarbonate having a number average molecular weight, Mn, in a range between about 8,000 daltons and about 50,000 daltons, said product polycarbonate comprising less than 1000 parts per million Fries product.

In a melt polymerization reaction of one or more dihydroxy aromatic compounds and one or more diaryl carbonates, the tetraarylphosphonium compound may be typically employed in an amount corresponding to between about $1 \times 10^{-8}$ and about $1 \times 10^{-3}$ moles dihydroxyaromatic compound in one embodiment of the present invention. In a second embodiment the tetraalrylphosphonium salt may be employed in an amount between about $\times 10^{-6}$ and about $2.5 \times 10^{-4}$ moles per mole dihydroxy aromatic compound.

The dihydroxy aromatic compounds used according to the method of the present invention may be dihydroxy benzenes, for example hydroquinone (HQ), 2-methylhydroquinone, resorcinol, 5-methylresorcinol and the like; dihydroxy naphthalenes, for example 1,4-dihydroxynathalene, 2,6-dihydroxynaphthalene, and the like; and bisphenols, for example bisphenol A and 4,4'-sulfonyldiphenol. Typically, the dihydroxy aromatic compound comprises at least one bisphenol having structure I.

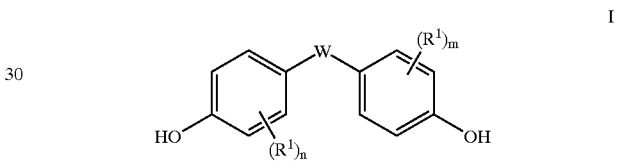

I wherein $R^1$ is independently at each occurrence a halogen atom, nitro group, cyano group, $C_1$–$C_{20}$ alkyl group, $C_4$–$C_{20}$ cycloalkyl group, or $C_6$–$C_{20}$ aryl group; n and m are independently integers 0–4; and W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical or the group.

Bisphenols having structure (I) are illustrated by bisphenol A; 2,2-bis(4-hydroxy-3-methylphenyl)propane; 2,2-bis(3-chloro-4-hydroxyphenyl)propane; 2,2-bis(3-bromo-4-hydroxyphenyl)propane; 2,2-bis(4-hydroxy-3-isopropylphenyl)propane; 1,1-bis(4-hydroxyphenyl)cyclohexane; 1,1-bis(4-hydroxy-3-methylphenyl)cyclohexane; and 1,1-bis(4-hydroxyphenyl)-3,3,5-trimethylcyclohexane and the like.

The diaryl carbonates used according to the method of the present invention include diaryl carbonates having structure II

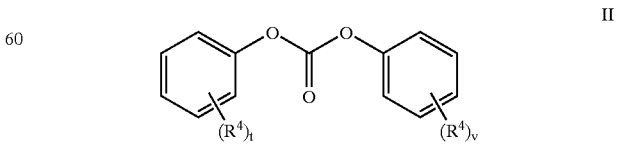

II wherein $R^4$ is independently at each occurrence a halogen atom, nitro group, cyano group, $C_1$–$C_{20}$ alkyl group, $C_1$–$C_{20}$ alkoxy carbonyl group, $C_4$–$C_{20}$cycloalkyl group, or $C_6$–$C_{20}$ aryl group; and t and v are independently integers 0–5.

Diaryl carbonates II are illustrated by diphenyl carbonate, bis(4-methylphenyl)carbonate, bis(4-chlorophenyl) carbonate, bis(4-fluorophenyl) carbonate, bis(2-chlorophenyl)carbonate, bis(2,4-difluorophenyl)carbonate, bis(4-nitrophenyl)carbonate, bis(2-nitrophenyl)carbonate, bis(methyl salicyl)carbonate, and the like.

In one embodiment of the present invention the catalyst is a tetraarylphosphonium compound having structure III

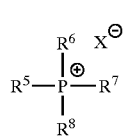

III wherein $R^5$–$R^8$ are independently a $C_4$–$C_{20}$ aryl radical; and $X^-$ is an organic or inorganic anion. Typically the anion $X^-$ is selected from the group consisting of hydroxide, halide, carboxylate, phenoxide, sulfonate, sulfate, carbonate, bicarbonate and tetraphenylboronate. Quaternary phosphonium sales having structure IV are illustrated by tetraphenylphosphonium hydroxide, tetraphenylphosphonium hydroxide, tetraphenylphosphonium acetate, tetraphenylphosphonium tetraphenylboronate and the like.

In structures III, the anion $X^-$ is typically an anion selected from the group consisting of hydroxide, halide, carboxylate, phenoxide, sulfonate, sulfate, carbonate, tetraphenyl boronate and bicarbonate. With respect to catalysts comprising structure III, where $X^-$ is a polyvalent anion such as carbonate or sulfate it is understood that the positive and negative charges in structures III are properly balanced. For example, in tetrabutylphosphonium carbonate where $R^5$–$R^8$ in structure IV are each butyl groups and $X^-$ represents a carbonate anion, it is understood that $X^-$ represents $\frac{1}{2}$ $(CO_3^{-2})$.

The catalyst may be added in a variety of forms according to the method of the present invention. The catalyst may be added as a solid, for example a powder, or it may be dissolved in a solvent, for example water or alcohol. In one embodiment, the catalyst is added to the reaction system in the form of an aqueous solution. The pH of the aqueous solution is preferably at or near the pH of a freshly prepared solution, which varies depending on the identity of the catalyst used.

In some instances the reaction mixture may further comprise a co catalyst which may be a metal hydroxide, for example, an alkali metal hydroxide such as sodium hydroxide. The free metal hydroxide may be added to enhance the activity of the primary catalyst, or may be present as a contaminant in the primary catalyst itself. If present, the free metal hydroxide may be present in a range between about $1 \times 10^{-9}$ and about $2.5 \times 10^{-3}$ moles of catalyst per mole of dihydroxy aromatic compound employed in one embodiment of the present invention. In a second embodiment the alkali metal hydroxide may be present in a range between about $1 \times 10^{-8}$ and about $2.0 \times 10^{-4}$ moles of catalyst per mole of dihydroxyaromatic compound and in a third embodiment of the present invention the metal hydroxide may be present in a range between about $5 \times 10^{-7}$ and about $1 \times 10^{-5}$ moles of catalyst per mole of dihydroxyaromatic compound.

According to the method of the present invention the melt polymerization is carried out in at least two distinct stages. In the first stage an oligomeric polycarbonate is produced which is then be converted in at least one additional into a high molecular weight polycarbonate. The high molecular weight product is produced by increasing the temperature and reducing the pressure relative to the temperature and pressure regime employed in the oligomerization stage. Typically, the reaction temperature employed in the first stage to produce an oligomeric polycarbonate is in a range between about 180° C. and about 280° C., preferably between about 200° C. and about 280° C. In the second stage of the method of the present invention, Step (B), the oligomeric polycarbonate formed in the first stage, Step (A), is subjected to still higher temperature and lower pressure than that employed in the oligomerisation stage, thereby effecting conversion of the oligomeric polycarbonate to high molecular weight polycarbonate. This second stage , Step (B), is also referred to as the "polymerization stage". In one embodiment the pressure used in the polymerization stage is in a range between about 0.01 mbar and about 50 mbar. In a second embodiment the pressure used in the polymerization stage is in a range between about 0.05 mbar and about 30 mbar. In a third embodiment the pressure used in the polymerization stage is in a range between about 0.1 mbar and about 20 mbar. The number average molecular weight of the oligomeric polycarbonate formed in the first stage is typically in a range between about 500 and about 10,000 daltons. In a second embodiment the number average molecular weight of the oligomeric polycarbonate formed in the first stage is in a range between about 700 daltons and about 8000 daltons. In a third embodiment the number average molecular weight of the oligomeric polycarbonate formed in the first stage is in a range between about 1000 daltons and about 7500 daltons. When the temperature of the reactants is increased and the pressure reduced in the second stage the oligomeric polycarbonate is increased as it is transformed by chain growth into a high molecular weight product polycarbonate. In one embodiment of the present invention the weight average molecular weight of the product polycarbonate is in a range between about 15,000 daltons and about 50,000 daltons. In a second embodiment of the present invention the weight average molecular weight of the product polycarbonate is in a range between about 16,500 daltons and about 40,000 daltons. In a third embodiment of the present invention the weight average molecular weight of the product polycarbonate is in a range between about 17,000 daltons and about 35,000 daltons. Additionally, the product polycarbonates prepared according to the method of the present invention typically possess lower levels of Fries product than product polycarbonates prepared under comparable conditions of reaction time, reaction temperature, catalyst loading and the like, using conventional catalyst systems. In general, it is desirable to limit the amount of Fries product present in the product polycarbonate to the greatest extent possible since high Fries levels can produce discoloration and serve as sites for uncontrolled polymer branching which can affect the melt flow properties of the product polycarbonate. Generally, the level of Fries rearrangement product present in high molecular weight polycarbonate prepared according to the method of the present invention is less than about 1000 parts per million, and in some embodiments less than 500 parts per million.

The pressure employed at the outset of the oligonierization stage may be at atmospheric pressure, supra-atmospheric pressure. Typically, the pressure during the oligomerization stage is in a range between about 180 mbar and about 20 mbar and at still lower pressure during the polymerization stage.

The total reaction time is typically in a range between about 0.1 hours and about 10 hours. In one embodiment of the present invention the total time of reaction may be in a range between about 1 hours and about 6 hours. In an alternate embodiment the total reaction time is in a range between about 2 hours and about 5 hours.

The catalyst and co-catalysts employed according to the method of the present invention may be added in the same stage or different stages. The optional co-catalyst may be added at any stage, although in some embodiments it may be added early in the process.

The method of the present invention may be conducted as a batch process, a semibatch process, or as a continuous process. In any case, the melt polymerization conditions used comprise at least two or more distinct reaction stages, a first reaction stage in which the starting diaryl carbonate and dihydroxy aromatic compound are converted into an oligomeric polycarbonate and a second reaction stage wherein the oligomeric polycarbonate formed in the first reaction stage is converted to high molecular weight polycarbonate. Such "staged" polymerization reaction conditions are especially suitable for use in continuous polymerization systems wherein the starting monomers are oligomerized in a first reaction vessel and the oligomeric polycarbonate formed therein is continuously transferred to one or more downstream reactors in which the oligomeric polycarbonate is converted to high molecular weight polycarbonate.

Additionally, the method of the present invention may be carried out in the presence of an endcapping agent. Thus, in one embodiment of the present invention at least one endcapping agent, at least one dihydroxy aromatic compound, at least one diaryl carbonate, at least one catalyst and at least one coatalyst, said catalyst comprising at least one tetraarylphosphonium compound and said co-catalyst comprising at least one alkali metal hydroxide are reacted in a first oligomerization stage under melt polymerization conditions to provide an oligomeric polycarbonate which is then converted in a second polymerization stage to a high molecular weight polycarbonate comprising terminal groups derived from the endcapping agent. Typically, the endcapping agent is a monofunctional phenol such as cardanol, p-cresol, p-tert-butylphenol, and p-cumylphenol and is used in an amount corresponding to between about 0.01 and about 0.07 moles of endcapping agent per mole of dihydroxy aromatic compound employed. For example when p-tert-butylphenol is used as the endcapping agent the product polycarbonate prepared according to the method of the present invention comprises terminal p-tert-butylphenoxy groups.

In some aspects the method of the present invention is superior to earlier melt polymerization methods based upon the molecular weights of the polycarbonate polymer and upon the speed at which the polymerization reaction occurs under the influence of the tetraarylphosphonium catalyst and the alkali metal hydroxide coatalyst combination employed. Thus, higher molecular weight product polycarbonates are obtained in a shorter period of time. Additionally, the product polycarbonates prepared according to the method of the present invention typically possess lower levels of Fries product than product polycarbonates prepared under comparable conditions of reaction time, reaction temperature, catalyst loading and the like, using conventional catalyst systems. In general, it is desirable to limit the amount of Fries product present in the product polycarbonate to the greatest extent possible since high Fries levels can produce discoloration and serve as sites for uncontrolled polymer branching which can affect the melt flow properties of the product polycarbonate. Generally, the level of Fries rearrangement product present in high molecular weight polycarbonate prepared according to the method of the present invention is less than about 1000 parts per million, and in some embodiments less than 500 parts per million.

It is understood, especially for melt reactions of the type presented in the instant invention, that the purity of the monomers employed may strongly affect the properties of the product polycarbonate. Thus, it is frequently desirable that the monomers employed be free of, or contain only very limited amounts of, contaminants such as metal ions, halide ions, acidic contaminants and other organic species. This may be especially true in applications such as optical disks, (e.g. compact disks) where contaminants present in the polycarbonate can affect disk performance. Typically the concentration of metal ions, for example iron, nickel, cobalt, sodium, and potassium present in the monomer should be less than about 10 ppm, preferably less than about 1 ppm and still more preferably less than about 100 parts per billion (ppb). The amount of halide ion present in the polycarbonate, for example fluoride, chloride and bromide ions, should be minimized in order to inhibit the absorption of water by the product polycarbonate as well as to avoid the corrosive effects of halide ion on equipment used in the preparation of the polycarbonate. Certain applications, for example optical disks, may require very low levels of halide ion contaminants Preferably, the level of halide ion present in each monomer employed should be less than about 1 ppm. The presence of acidic impurities, for example organic sulfonic acids that may be present in bisphenols such as BPA, should be minimized since only minute amounts of basic catalysts are employed in the oligomerization and subsequent polymerization steps. Even a small amount of an acidic impurity may have a large effect on the rates of oligomerization and polymerization since it may neutralize a substantial portion of the basic co-catalyst employed. Lastly, the tendency of polycarbonates to degrade at high temperature, for example during molding, with concomitant loss of molecular weight and discoloration correlates strongly with the presence of contaminating species within the polycarbonate. In general, the level of purity of a product polycarbonate prepared using a melt reaction method such as the instant invention will closely mirror the level of purity of the starting monomers.

The polycarbonate made by the method of the present invention may optionally be blended with any conventional additives, including but not limited to dyestuffs, UV stabilizers, antioxidants, heat stabilizers, and mold release agents, in order to facilitate the formation and use of a molded article. In particular, it is preferable to form a blend of the polycarbonate made by the method of the present invention and additives that serve as process aids during the molding process and which confer additional stability upon the molded article. The blend may optionally comprise from about 0.0001 to about 10% by weight of the desired additives, and in some embodiments from about 0.0001 to about 1.0% by weight of the desired additives.

Substances or additives which may be added to the polycarbonate of this invention, include, but are not limited to, heat-resistant stabilizers, UV absorbers, mold-release agents, antistatic agents, slip agents, antiblocking agents, lubricants, anticlouding agents, coloring agents, natural oils, synthetic oils, waxes, organic fillers, inorganic fillers, and mixtures thereof.

Examples of the aforementioned heat-resistant stabilizers, include, but are not limited to, phenol stabilizers, organic thioether stabilizers, organic phosphite stabilizers, hindered amine stabilizers, epoxy stabilizers and mixtures thereof. The heat-resistant stabilizer may be added in the form of a solid or liquid.

Examples of UV absorbers include, but are not limited to, salicylic acid UV absorbers, benzophenone UV absorbers, benzotriazole UV absorbers, cyanoacrylate UV absorbers, and mixtures thereof.

Examples of the mold-release agents include, but are not limited to natural and synthetic paraffins, polyethylene waxes, fluorocarbons, and other hydrocarbon mold-release agents; stearic acid, hydroxystearic acid, and other higher fatty acids, hydroxyfatty acids, and other fatty acid mold-release agents; stearic acid amide, ethylenebisstearamide, and other fatty acid amides, alkylenebisfatty acid amides, and other fatty acid amide mold-release agents; stearyl alcohol, cetyl alcohol, and other aliphatic alcohols, polyhydric alcohols, polyglycols, polyglycerols and other alcoholic mold release agents; butyl stearate, pentaerythritol tetrastearate, and other lower alcohol esters of fatty acid, polyhydric alcohol esters of fatty acid, polyglycol esters of fatty acid, and other fatty acid ester mold release agents; silicone oil and other silicone mold release agents, and mixtures of any of the aforementioned.

The coloring agent may be either pigments or dyes. Inorganic coloring agents and organic coloring agents may be used separately or in combination in the invention.

EXAMPLES

The following examples are set forth to provide those of ordinary skill in the art with a detailed description of how the methods claimed herein are carried out and evaluated, and are not intended to limit the scope of what the inventors regard as their invention. Unless indicated otherwise, parts are by weight, temperature is in ° C.

Molecular weights are reported as number average ($M_n$) or weight average ($M_w$) molecular weight and were determined by gel permeation chromatography (GPC) relative to a polycarbonate standard of known molecular weight.

Fries content was measured by the KOH methanolysis of resin and is reported as parts per million (ppm). The Fries content was determined as follows. First, 0.50 grams of the product polycarbonate was dissolved in 4.0 ml of THF (containing p-terphenyl as internal standard). Next, 3.0 mL of 18% KOH in methanol was added to this solution. The resulting mixture was stirred for two hours at room temperature. Next, 1.0 mL of acetic acid was added, and the mixture was stirred for 5 minutes. Potassium acetate by-product was allowed to crystallize over 1 hour. The solid was filtered off and the resulting filtrate was analyzed by high performance liquid chromatography (HPLC) using p-terphenyl as the internal standard.

Polycarbonate Preparation

To facilitate observations and for purity melt transesterification reactions were carried out in a 1 Liter glass batch reactor equipped with a solid nickel helical agitator. The reactor bottom had a breakaway glass nipple for removal of the final melt. To remove any sodium from the glass the reactor was soaked in 3N HCl for at least 12 hours followed by a soak in 18 Mohm water for at least 12 hours. The reactor was then dried in an oven overnight and stored covered until use. The temperature of the reactor was maintained using a fluidised sand bath with a PID controller. The temperature was measured near the reactor and sand bath interface. The pressure over the reactor was controlled by a nitrogen bleed into the vacuum pump downstream of the distillate collection flasks and measured at higher pressures (760 mmHg–40 mmHg) with a mercury barometer and at lower pressures (40 mmHg–1 mmHg) with an Edwards pirani gauge.

The reactor was charged with solid Bisphenol-A (General Electric Plastics Japan Ltd., 0.6570 mol) and solid diphenyl carbonate (General Electric Plastics Japan Ltd., 0.7096 mol) prior to assembly. The reactor was then assembled, sealed and the atmosphere was exchanged with nitrogen three times. With the final nitrogen exchange the reactor was brought to near atmospheric pressure and submerged into the fluidised bath which was at 180° C. After five minutes agitation was begun at 250 rpm. After an additional ten minutes the reactants were fully melted and a homogeneous mixture was assumed. Tetraphenylphosphoniumtetraphenyl boronate(TPPTPB) ($1.32 \times 10^{-4}$ mol) and NaOH (J. T. Baker, $5.00 \times 10^{-7}$ mol) were added sequentially after being diluted to the proper concentrations (0.220 M TPPTPB and $5.00 \times 10^{-3}$ M NaOH) with 18 Mohm water. After the final catalyst was added timing began and the temperature was ramped to 230° C. in five minutes. Once at temperature the pressure was reduced to 180 mmHg and phenol distillate was immediately observed. After 25 minutes the pressure was again reduced to 100 mmHg and maintained for 45 minutes. The temperature was then ramped to 260° C. in five minutes and the pressure was lowered to 15 mmHg. These conditions were maintained for 45 minutes. The temperature was then ramped to 270° C. in five minutes and the pressure was lowered to 2 mmHg. These conditions were maintained for 10 minutes. The temperature was then ramped to the final finishing temperature in five minutes and the pressure was reduced to 1.1 mmHg. The finishing temperature was 310° C. After 30 minutes the reactor was removed from the sand bath Examples 1 and 2 and Comparative Examples 1–4 were run as batch reactions according to the general experimental protocol described above. The data in Table 1 illustrate the surprising efficacy of the tetraarylphosphonium catalyst, tetraphenylphosphonium tetraphenylboronate (TPPTPB, Example 1) and TPPTPB in combination with the co-catalyst sodium hydroxide (Example 2) when used according to the method of the present invention. Comparative Examples 1 and 2 illustrate the relative ineffectiveness of catalyst systems consisting of tetramethylarnmonium hydroxide (TMAH, Comparative Example 1) and TMAH in combination with sodium hydroxide as a co-catalyst (Comparative Example 2) under reaction conditions identical to those employed in Examples 1 and 2. Similarly, Comparative Examples 3 and 4 illustrate the relative ineffectiveness of catalyst systems consisting of tetrabutylphosphonium acetate (TBPA, Comparative Example 3) and TBPA in combination with sodium hydroxide as a co-catalyst (Comparative Example 4). The data illustrate that the unique combination of a tetraarylphosphomium catalyst and optionally an alkali metal hydroxide co-catalyst, with the two stage polymerization protocol of the present invention surprisingly provides high molecular weight polycarbonates having low levels of terminal OH groups and low levels of Fries rearrangement product. In the Examples and the Comparative Examples the concentration of the TMAH, TBPA or TPPTPB employed was $5 \times 10^{-5}$ moles per mole BPA. Where used the concentration of the sodium hydroxide co-catalyst was $1 \times 10^{-6}$ moles per mole BPA.

TABLE 1

CATALYST EVALUATION UNDER TWO STAGE MELT POLYMERIZATION CONDITIONS

| Example No. | Catalyst | $M_n$ | [OH] ppm | Fries level ppm |
|---|---|---|---|---|
| Comparative Example-1 | TMAH | 675 | | <100 |
| Comparative Example-2 | TMAH/NaOH | 9349 | 844 | 865 |
| Comparative Example-3 | TBPA | 6175 | | <100 |
| Comparative Example-4 | TBPA/NaOH | 9596 | 1053 | 865 |
| Example 1 | TPPTBP | 9430 | 847 | 338 |
| Example 2 | TPPTBP/NaOH | 10436 | 780 | 1009 |

The invention has been described in detail with particular reference to preferred embodiments thereof, but it will be understood by those skilled in the art that variations and modifications can be effected within the spirit and scope of the invention.

What is claimed is:

1. A method of preparing polycarbonate, said method comprising (A) oligomerising in the presence of a catalyst, at least one diaryl carbonate and at least one dihydroxyaromatic compound at a temperature in a range between about 220 and about 280° C. and a pressure in a range between about 180 mbar and about 20 mbar, said catalyst consisting of a tetraaryl phosphonium compound and optionally an alkali metal hydroxide co-catalyst, to provide an oligomeric polycarbonate having a number average molecular weight in a range between about 1000 and about 7500 daltons and (B) in a second step hearing the oligomeric polycarbonate formed in step (A) at a temperature in a range between about 280 and about 310° C. and at pressure in a range between about 15 mbar and about and about 0.1 mbar to provide a polycarbonate having a weight average molecular weight between about 15000 daltons and about 50,000 daltons, said method comprising less than about 1000 parts per million Fries product.

2. A method according to claim 1 wherein said dihydroxy aromatic compound is a bisphenol having structure I

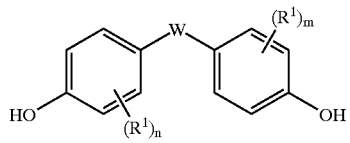

wherein $R^1$ is independently at each occurrence a halogen atom, nitro group, cyano group, $C_1$–$C_{20}$ alkyl group, $C_4$–$C_{20}$ cycloalkyl group, or $C_6$–$C_{20}$ aryl group; n and m are independently integers 0–4; and W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical or the group

wherein $R^2$ and $R^3$ are independently a hydrogen atom, $C_1$–$C_{20}$ alkyl group, $C_4$–$C_{20}$ cycloalkyl group, or $C_4$–$C_{20}$ aryl group; or $R^2$ and $R^3$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups or a combination thereof.

3. A method according to claim 2 wherein said bisphenol is selected from the group consisting of bisphenol A; 2,2-bis(4-hydroxy-3-methylphenyl)propane; 2,2-bis(3-chloro-4-hydroxyphenyl)propane; 2,2-bis(3-bromo-4-hydroxyphenyl)propane; 2,2-bis(4-hydroxy-3-isopropylphenyl)propane; 1,1-bis(4-hydroxyphenyl)cyclohexane; 1,1-bis(4-hydroxy-3-methylphenyl)cyclohexane; and 1,1-bis(4-hydroxyphenyl)-3,3,5-trimethylcyclohexane.

4. A method according to claim 1 wherein said diaryl carbonate has structure II

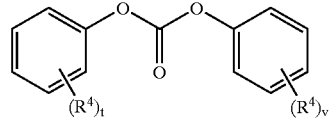

wherein $R^4$ is independently at each occurrence a halogen atom, nitro group, cyano group, $C_1$–$C_{20}$ alkyl group, $C_1$–$C_{20}$ alkoxy carbonyl group, $C_4$–$C_{20}$ cycloalkyl group, or $C_6$–$C_{20}$ aryl group; and t and v are independently integers 0–5.

5. A method according to claim 1 wherein said diaryl carbonate is selected from the group consisting of diphenyl carbonate, bis(4-methylphenyl)carbonate, bis(4-chlorophenyl)carbonate, bis(4-fluorophenyl)carbonate, bis(2-chlorophenyl) carbonate, bis(2,4-difluorophenyl) carbonate, bis(4-nitrophenyl)carbonate, bis(2-nitrophenyl) carbonate, and bis(methyl salicyl)carbonate.

6. A method according to claim 1 wherein said tetraarylphosphonium compound has structure III

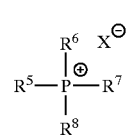

wherein $R^5$–$R^8$ are independently a $C_4$–$C_{20}$ aryl radical; and $X^-$ is an organic or inorganic anion.

7. A method according to claim 6 wherein said anion is selected from the group consisting of hydroxide, halide, carboxylate phenoxide, sulfonate, sulfate, carbonate, tetraphenylboronate and bicarbonate.

8. A method according to claim 6 wherein said quaternary phosphonium compound is tetraphenylphosphonium-tetraphenylboronate.

9. A method according to claim 1 wherein said co-catalyst is sodium hydroxide.

10. A method according to claim 1 wherein said oligomerizing is carried out in the presence of at least one endcapping agent.

11. A method according to claim 10 wherein said endcapping agent is a hydroxy aromatic compound.

12. A method according to claim 11 wherein said hydroxy aromatic compound is selected from the group consisting of phenol, p-tert-butylphenol, p-cumylphenol, and cardanol.

13. A method according to claim 1 which is a continuous process.

14. A method according to claim 1 which is a batch process.

15. A method for the preparation of polycarbonate, said method comprising contacting at least one dihydroxy aromatic compound with at least one diaryl carbonate under melt polymerization conditions in the presence of a catalyst, and a co-catalyst, said catalyst consisting of at least one tetraarylphosphonium compound, said co-catalyst consisting of at least one alkali metal hydroxide said contacting being carried out in at least two stages, to produce a product polycarbonate, said product polycarbonate comprising less than 1000 parts per million Fries.

16. A method according to claim 15 wherein said two stages consist of an oligomerization stage which affords an oligomeric polycarbonate having a number average molecular weight in a range between about 1000 and about 7500 daltons, and at least one subsequent polymerization stage wherein said oligomeric polycarbonate is converted into a high molecular weight polycarbonate having a weight average molecular weight in a range between about 15000 and about 50000 daltons.

17. A method according to claim 15 wherein the oligomerisation stage is conducted at a temperature in a range between about 220 and about 280° C. and at a pressure in a range between about 180 mbar and about 20 mbar and wherein the polymerization stage is conducted at a temperature in a range between about 280 and about 310° C. and at a pressure between about 15 mbar and 0.1 mbar.

18. A method according to claim 15 wherein said diaryl carbonate is employed in an amount corresponding to between about 0.95 moles and about 1.15 moles of diaryl carbonate per mole of dihydroxy aromatic compound.

19. A method according to claim 15 wherein said dihydroxy aromatic compound is a bisphenol having structure I

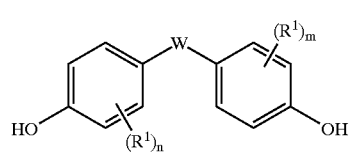

I wherein $R^1$ is independently at each occurrence a halogen atom, nitro group, cyano group, $C_1$–$C_{20}$ alkyl group, $C_4$–$C_{20}$ cycloalkyl group, or $C_6$–$C_{20}$ aryl group; n and m are independently integers 0–4; and W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical or the group

wherein $R^2$ and $R^3$ are independently a hydrogen atom, $C_1$–$C_{20}$ alkyl group, $C_1$–$C_{20}$ cycloalkyl group, or $C_4$–$C_{20}$ aryl group; or $R^2$ and $R^3$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups or a combination thereof.

20. A method according to claim 19 wherein said bisphenol is selected from the group consisting of bisphenol A; 2,2-bis(4-hydroxy-3-methylphenyl)propane; 2,2-bis(3-chloro4-hydroxyphenyl)propane; 2,2-bis(3-bromo-4-hydroxyphenyl)propane; 2,2-bis(4-hydroxy-3-isopropylphenyl)propane; 1,1-bis(4-hydroxyphenyl) cyclohexane; 1,1-bis(4-hydroxy-3-methylphenyl) cyclohexane; and 1,1-bis(4-hydroxyphenyl)-3,3,5-trimethylcyclohexane.

21. A method according to claim 15 wherein said diaryl carbonate has structure II

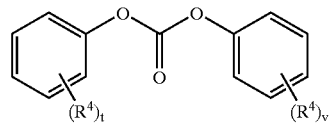

wherein $R^4$ is independently at each occurrence a halogen atom, nitro group, cyano group, $C_1$–$C_{20}$ alkyl group, $C_1$–C20 alkoxy carbonyl group, $C_4$–$C_{20}$ cycloalkyl group, or $C_6$–$C_{20}$ aryl group; and t and v are independently integers 0–5.

22. A method according to claim 15 wherein said diaryl carbonate is selected from the group consisting of diphenyl carbonate, bis(4-methylphenyl)carbonate, bis(4-chlorophenyl)carbonate, bis(4-fluorophenyl)carbonate, bis (2-chlorophenyl) carbonate, bis(2,4-difluorophenyl) carbonate, bis(4-nitrophenyl)carbonate, bis(2-nitrophenyl) carbonate, and bis(methyl salicyl) carbonate.

23. A process according to claim 15 wherein said diaryl carbonate is diphenyl carbonate, and said dihydroxy aromatic compound is bisphenol A.

24. A method according to claim 15 wherein said tetraarylphosphonium compound has structure III

III

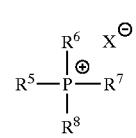

wherein $R^5$–$R^8$ are independently a $C_4$–$C_{20}$ aryl radical; and $X^-$ is an organic or inorganic anion.

25. A method according to claim 24 wherein said anion is selected from the group consisting of hydroxide, halide, carboxylate, phenoxide, sulfonate, sulfate, carbonate, tetraphenylboronate and bicarbonate.

26. A method according to claim 15 wherein said quaternary phosphonium compound is tetraphenylphosphonium-tetraphenylboronate.

27. A method of preparing bisphenol A polycarbonate, said method comprising (A) oligomerising in the presence of a catalyst, diphenyl carbonate and bisphenol A at a temperature in a range between about 220 and about 280° C. and a pressure in a range between about 180 mbar and about 20 mbar, said catalyst consisting of a tetraarylphosphonium compound and sodium hydroxide, to provide an oligomeric polycarbonate having a number average molecular weight in a range between about 1000 and about 7500 daltons and (B) in a second step heating the oligomeric polycarbonate formed in step (A) at a temperature in a range between about 280 and about 310° C. and at pressure in a range between about 15 mbar and about and about 0.1 mbar to provide a polycarbonate having a weight average molecular weight between about 15000 daltons and about 50,000 daltons, said method comprising less than about 1000 parts per million Fries product.

* * * * *